(12) United States Patent
Lindacher

(10) Patent No.: US 6,827,271 B2
(45) Date of Patent: *Dec. 7, 2004

(54) METHODS AND APPARATUS FOR DETERMINING A POSITION OF A ROTATING OPTICAL ELEMENT IN A BAR CODE SCANNER

(75) Inventor: Joseph M. Lindacher, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 497 days.

This patent is subject to a terminal disclaimer.

(21) Appl. No.: 09/878,462

(22) Filed: Jun. 11, 2001

(65) Prior Publication Data

US 2002/0185538 A1 Dec. 12, 2002

(51) Int. Cl.$^7$ .......................... G02B 26/00; G06K 7/10
(52) U.S. Cl. ..................... 235/462.4; 235/462.01; 235/462.38; 235/462.3; 235/462.36
(58) Field of Search ............... 235/462.4, 462.01, 235/462.38, 462.3, 462.36, 462.37, 462.33

(56) References Cited

U.S. PATENT DOCUMENTS

| | | | | |
|---|---|---|---|---|
| 4,239,326 A | | 12/1980 | Kramer | 350/3.71 |
| 4,289,371 A | | 9/1981 | Kramer | 350/3.71 |
| 4,655,541 A | | 4/1987 | Yamazaki et al. | 350/3.71 |
| 5,046,796 A | * | 9/1991 | Andoh et al. | 359/216 |
| 5,296,689 A | | 3/1994 | Reddersen et al. | 235/467 |
| 5,484,990 A | * | 1/1996 | Lindacher et al. | 235/462.22 |
| 5,546,201 A | | 8/1996 | Guerin | 359/17 |
| 5,719,385 A | * | 2/1998 | Wike et al. | 235/462.09 |
| 5,818,025 A | * | 10/1998 | Gregerson et al. | 235/462.35 |
| 5,838,479 A | | 11/1998 | Shiraishi | 359/204 |
| 5,933,268 A | | 8/1999 | Li et al. | 359/207 |
| 6,045,046 A | * | 4/2000 | Detwiler | 235/114 |
| 6,053,413 A | | 4/2000 | Swift et al. | 235/472.01 |
| 6,273,337 B1 | * | 8/2001 | Detwiler et al. | 235/462.32 |
| 6,293,468 B1 | * | 9/2001 | Rantze et al. | 235/462.25 |
| 6,347,741 B1 | * | 2/2002 | Blanford et al. | 235/462.02 |
| 6,394,351 B1 | * | 5/2002 | Keys et al. | 235/462.01 |
| 6,454,169 B1 | * | 9/2002 | Belknap et al. | 235/462.4 |
| 6,551,889 B2 | * | 4/2003 | Kovacic | 438/312 |

FOREIGN PATENT DOCUMENTS

JP    2001133715    * 5/2004

* cited by examiner

*Primary Examiner*—Karl D. Frech
*Assistant Examiner*—Daniel Walsh
(74) *Attorney, Agent, or Firm*—Priest & Goldstein, PLLC; Paul W. Martin

(57) ABSTRACT

Techniques for determining a position for a rotating optical element, or spinner, of a bar code scanner are described. A diffractive element is positioned so as to be struck by a laser beam produced by a laser source and reflected from the spinner when the spinner is in a reference position. The diffractive element diffracts the reflected beam to produce a diffracted line which strikes a reference position photodetector, thereby causing the reference position photodetector to produce a reference position photosignal. The reference position photosignal can be read by a controller to determine when the spinner is in the reference position and used by the controller as a signal to deactivate the laser source. The position of the spinner during its rotation can be computed based on the speed of the spinner and the time elapsed since the occurrence of the reference position photosignal, and the laser source can be activated when timing information indicates that the spinner is in an appropriate position to begin a single line scan pattern and deactivated when the reference position photosignal indicates that the spinner is in the correct position to terminate the single line scan pattern.

10 Claims, 5 Drawing Sheets

METHODS AND APPARATUS FOR DETERMINING A POSITION OF A ROTATING OPTICAL ELEMENT IN A BAR CODE SCANNER

FIELD OF THE INVENTION

The present invention relates generally to improved bar code scanning and processing. More particularly, the invention relates to methods and apparatus for achieving a highly precise determination of the position of a rotating optical element, or spinner, of a scanner, in order to provide a reference position for the spinner, which is used in computation of the position of the spinner in order to control elements of the scanner used to produce a desired scan pattern.

BACKGROUND OF THE INVENTION

Bar code scanners are used in a wide variety of applications and provide a fast and convenient way to collect data. Bar code scanners typically operate in one of at least two modes. A scanner may operate in an omnidirectional or multiline scan mode, producing a multiline scan pattern in which an array of scan lines is used to illuminate a bar code. Alternatively, a scanner may operate in a single line mode, producing a single scan line which is used to illuminate a bar code. A scanner may suitably be designed to operate exclusively in a single line or multiline mode, or may alternatively be designed so that the desired mode can be selected. Operation of a scanner in a single line mode provides the advantage of allowing an operator to aim the scan line more precisely, in order to avoid inadvertently scanning bar codes which may be located near the bar code which it is desired to scan.

In order to produce a scan pattern, a scanner directs a laser beam from a laser source to a mirrored polygonal spinner which is rotated by an electric motor. The sides of the polygonal spinner may be referred to as facets. The spinner directs light to one or more mirrors in order to produce a scan pattern which is directed to and emerges from an aperture. It is possible to design a scanner which produces only an omnidirectional scan pattern. In a scanner having such a design, the laser source may simply be turned on continuously as the spinner rotates. The laser beam is sequentially directed by the spinner over the entire set of pattern mirrors, which reflect the laser beam to produce lines making up the scan pattern. Alternatively, it is possible to design a scanner which produces only a single line scan pattern. In such a scanner, the pattern mirror and other optical components of the scanner may be arranged and configured so that the laser source may remain activated at all times, while the laser beam is reflected out of the scanner so as to form a single line scan pattern.

In order to provide greater flexibility in operation, it may be desirable to design a scanner which can operated in an omnidirectional or a single line scan mode, depending on a user selection or other criteria. In designing such a scanner, it is desirable to use a single set of pattern mirrors to minimize the cost and complexity of the scanner. The pattern mirrors and other internal optics are designed in such a way that a multiline scan pattern will be produced if the laser beam remains activated at all times during the rotation of the spinner, and that a single line scan pattern will be produced if the laser beam is activated and deactivated when the spinner is in appropriate positions. Typically, the laser source is activated when the spinner is oriented such that the laser beam is reflected by the spinner so as to be directed to an initial position and remains activated while the spinner turns so that the reflected laser beam is swept from the initial position to a terminal position. The laser source is deactivated when the reflected laser beam reaches the terminal position, and remains deactivated while the spinner turns, until the spinner is once again in a position to direct the reflected laser beam to the initial position.

In order to produce a single line scan pattern by controlling activation and deactivation of the laser source, it is important to turn the laser source on and off when the spinner is at the correct positions. Because the speed of the spinner is typically constant once the spinner has achieved operating speed, the relative position of the spinner can be known once the spinner has achieved operating speed. For example, it is possible to know when the spinner has turned through 20 degrees from a reference position. However, in order to know the actual position of the spinner at a particular time, it is necessary to accurately determine that the spinner is in a particular known position, or reference position, at some point after the spinner has achieved operating speed. Using a sensing device to determine when the spinner is in a reference position is difficult because variations from motor to motor make it difficult to adapt a sensor to determine the position of the specific motor used, and because additional difficulties are introduced by the acceleration period while the spinner is started and brought to operating speed. There exists, therefore, a need for a highly accurate way to identify when a spinner is at a reference position.

SUMMARY OF THE INVENTION

A scanner according to the present invention includes a laser source, a spinner rotated by a motor, a controller for controlling the speed and operation of the motor and a reference position photodetector. Because the spinner is affixed to the motor, the relative position of the motor determines the relative position of the spinner. The scanner also includes a set of pattern mirrors having a diffractive element. The diffractive element is positioned so as to be struck by a laser beam reflected from the spinner when the spinner is in the reference position. When the diffractive element is struck by the laser beam, the element generates a refracted line orthogonal to the direction of scan. The refracted line strikes the reference position photodetector. When the refracted line strikes the reference position detector, a signal is generated which can be read by the controller to determine that the spinner is in a reference position. In one particularly advantageous mode of operation, the laser beam may be activated when the spinner is positioned to direct the laser beam to an initial point of a single line scan pattern. The spinner turns, causing the laser beam to trace through the scan pattern. The reference position is chosen to coincide with the terminal position of the laser beam at the scan pattern, so that when the laser beam reaches the reference position, the beam strikes the diffractive element, causing a refracted line to be produced. The refracted line strikes the reference position photodetector. The reference position photodetector sends a signal to the controller, allowing the controller to detect that the laser beam is at the reference position. Because the reference position is also the terminal position of the scan pattern, the controller causes the laser beam to be deactivated. Once the controller determines that the spinner is in a reference position, the relative position of the spinner can be determined by, for example, using the known speed of the spinner and computing the displacement of the spinner from the reference position using the elapsed time and the speed of the spinner. Because the reference position has been precisely determined and the relative position can be computed, it is possible for the controller to compute when the spinner will again reach the correct position so that the laser beam may be activated in order to be deflected to the initial position of the scan pattern.

A more complete understanding of the present invention, as well as further features and advantages of the invention, will be apparent from the following Detailed Description and the accompanying drawings.

DETAILED DESCRIPTION

Figure 1A:
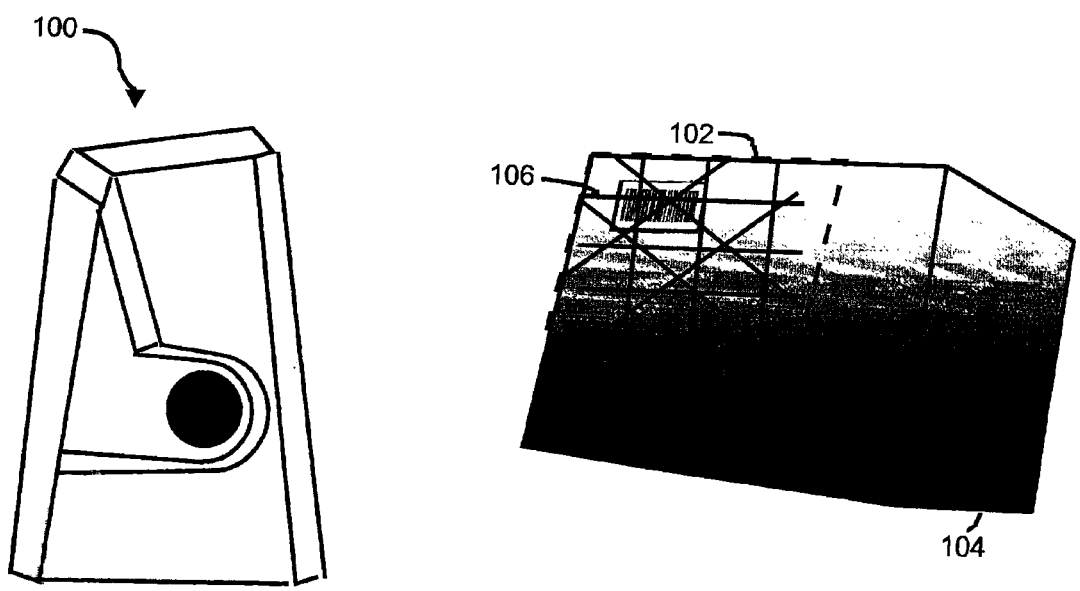
FIG. 1A illustrates a scanner according to the present invention.

FIG. 1A illustrates a scanner 100 according to an aspect of the present invention. The scanner 100 is shown here as generating a multiline scan pattern 102. The scan pattern 102 is directed at a product 104 bearing a single bar code 106. The scan pattern 102 strikes the bar code 106 and extends beyond the bar code 106. The multiple lines of the scan pattern 102 illuminate the bar code 106 in multiple directions and provide more information than would a single line scan pattern. Because no other bar codes are present in the vicinity of the bar code 106, the fact that the scan pattern 102 extends past the bar code 106 does not present a risk of reading a bar code which is not intended to be read and thereby causing an erroneous result.

Figure 1B:
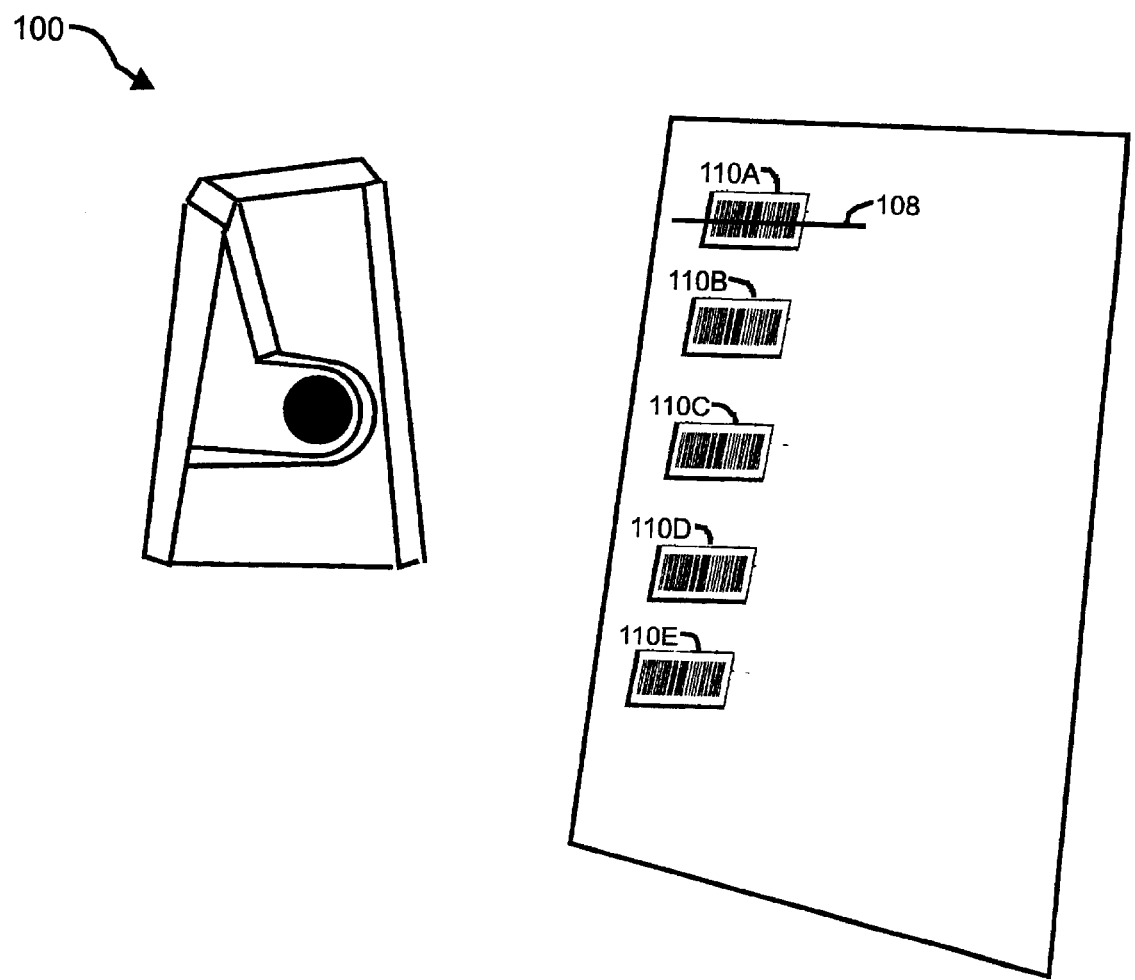
FIG. 1B illustrates another view of a scanner according to the present invention.

FIG. 1B illustrates the scanner 100 generating a single line scan pattern 108, directed at a sheet of paper bearing a plurality of bar codes 110A–110E. The single line scan pattern 108 strikes the bar code 110A and extends in only one dimension. The fact that the scan pattern 108 extends in only one dimension allows it to be directed so as to illuminate the bar code 110A without excessive risk that one of the bar codes 110B–110E will be illuminated in addition to or instead of the bar code 110A, thereby causing an erroneous result.

Figure 1C:
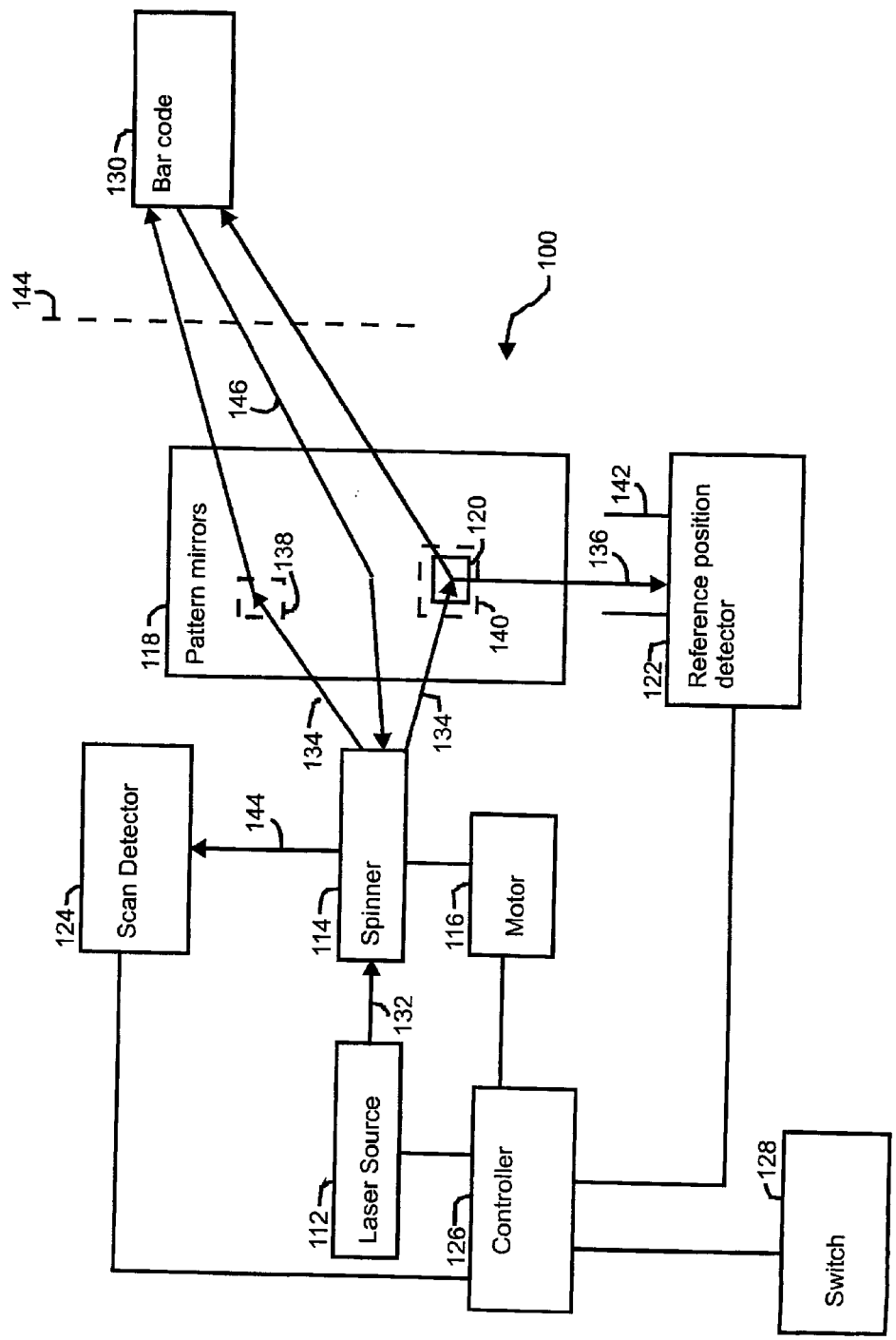
FIG. 1C illustrates functional details of a scanner according to the present invention.

FIG. 1C illustrates functional components of a scanner 100 according to the present invention. The scanner 100 includes a laser source 112, a spinner 114, a motor 116 and a set of pattern mirrors 118. The set of pattern mirrors 118 includes a diffractive element 120, which is better seen in FIG. 2. The scanner 100 also includes a reference position detector 122 and a scan detector 124, as well as a controller 126 for controlling the motor 116 and the laser source 112 and for recognizing and processing signals provided by the reference position detector 122 and the scan detector 124. The scanner 100 also includes a user interface such as a switch 128 to allow a user to activate and deactivate the scanner 100 and to select the scan pattern produced by the scanner 100. In the embodiment illustrated here, the user selects a deactivated mode, an omnidirectional scan pattern or a single line scan by moving the switch 128 to an appropriate position. Typically, only the single line scan pattern requires knowledge of the reference position of the spinner 114 provided by the reference position detector 122.

When an operator moves the switch 128 from the inactive position and sets the switch 128 to produce an omnidirectional scan, the controller 126 senses the position of the switch 128 and activates the laser source 112. The laser source 112 produces a laser beam 132 which is reflected from the spinner 114 to produce a reflected beam 134. The reflected beam 134 sweeps across the pattern mirrors 118 and is directed by the pattern mirrors 118 to produce a scan pattern which emerges from the aperture 144. Whenever the spinner 114 reaches a reference position, the spinner 114 reflects the laser beam 132 such that the reflected beam 134 strikes the diffractive element 120. The diffractive element 120 produces a diffracted line 136 orthogonal to the scan direction. The diffractive element 120 is preferably positioned such that there is no line of sight direction from the diffractive element 120 to the scan detector 124, in order to minimize false scans or other undesired effects which might otherwise be caused from scattered light produced by the diffractive element 120. The diffracted line 136 strikes the reference position detector 122 and the reference position detector 122 sends a reference position photosignal to the controller 126. However, when the scanner 100 is set to an omnidirectional mode, the controller 126 may suitably ignore the reference position photosignal. The scan detector 124, however, produces a photosignal whenever the scan pattern strikes a bar code such as the bar code 130, producing reflected light 146 which enters the scanner, is directed by the pattern mirrors 118 to the spinner 114 and is then directed by the spinner 114 onto the scan detector 124, allowing the controller 126 to detect and process bar codes illuminated by the scan pattern.

When the operator moves the switch 128 so as to produce a single line scan pattern, the controller 126 detects and processes reference position photosignals produced by the reference position detector 122. In order to produce a single line scan pattern, the laser source 112 is activated during a portion of the rotation of the spinner 114 and then deactivated. As illustrated here, the laser source 112 is activated when the spinner 114 is in a position such that a reflected beam 134 is in an initial position 138 and deactivated when the spinner 114 reaches a position such that the reflected beam is in a terminal position 140. The terminal position 140 here coincides with the diffractive element 120.

When the reflected beam 134 strikes the diffractive element 120, the diffracted line 136 is produced and strikes the reference position detector 122. The reference position detector 122 produces a reference position photosignal which is furnished to the controller 126. In order to prevent false signals, the reference position detector 122 preferably possesses a baffling aperture 142 to prevent the reference position detector 122 from being struck by light from sources other than the diffracted beam 136. The controller 126 detects the reference position photosignal and deactivates the laser source 112. Once the spinner 114 has achieved operating speed, typically within a few seconds after activation of the scanner 100, the speed of the spinner 114 is known and constant. The controller 126 is therefore able to identify when the spinner 114 reaches the correct position so that the reflected beam 134 will be in the initial position 138 by noting the time elapsed after the spinner 114 reaches the reference position. At the required time after the spinner 114 reaches the reference position as indicated by the reference position photosignal, the controller 126 assumes that the spinner 114 has reached the proper position to direct the reflected beam 134 to the initial position 138. The controller 126 then activates the laser source 112. When the reflected beam 134 reaches the terminal position 140, reflected beam strikes the diffractive element 120 to produce the diffracted line 138, causing the reference position photodetector 122 to produce a reference position photosignal. The controller 126 detects the reference position photosignal, deactivates the laser source 112 and again waits until the spinner 114 reaches the correct position for activation of the laser source 112.

Figure 2:
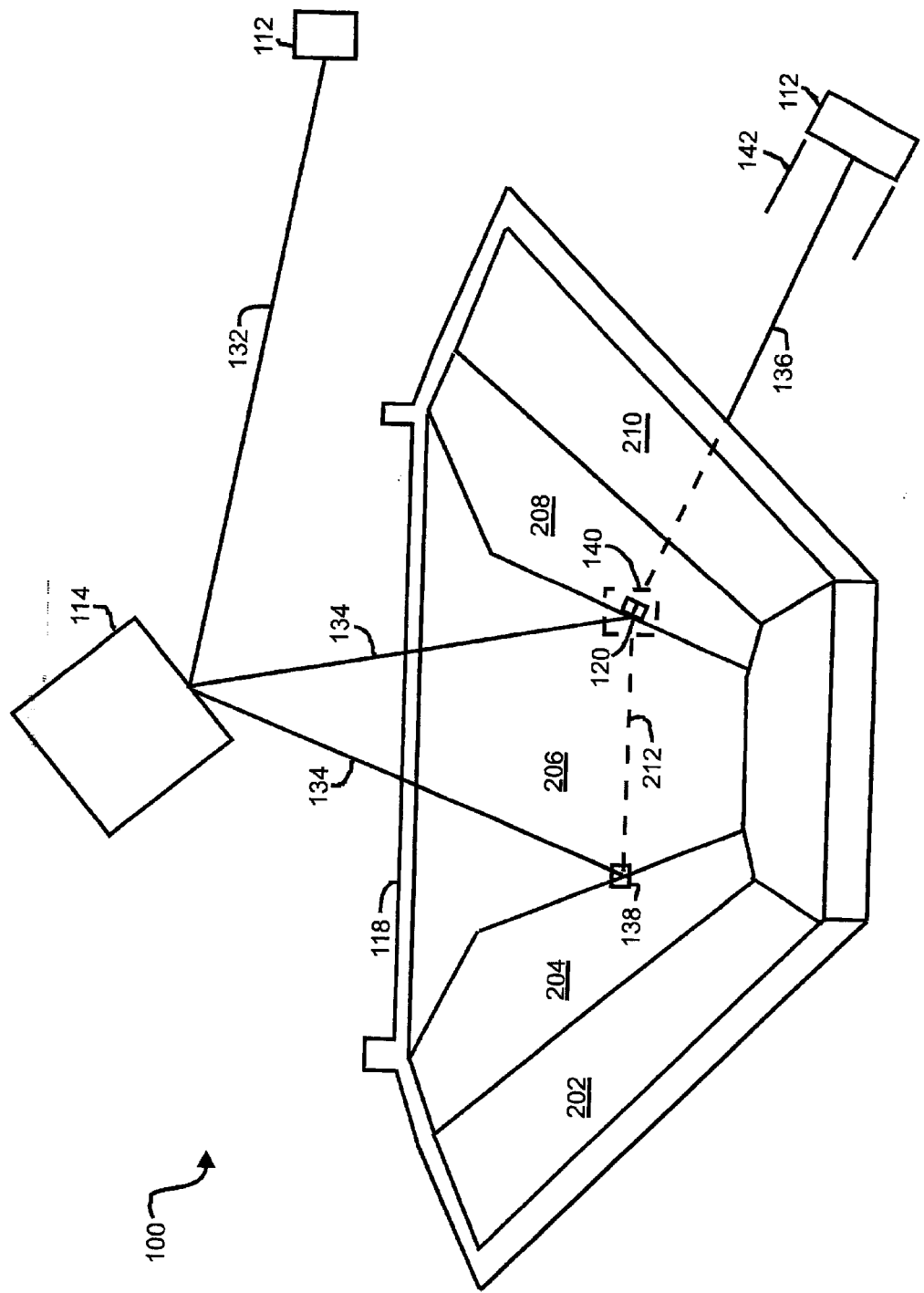
FIG. 2 illustrates a set of pattern mirrors including a diffractive element according to the present invention.

FIG. 2 illustrates relevant elements of the interior of the scanner 100. The laser source 112, the spinner 114 and the set of pattern mirrors 118 are illustrated here. The set of pattern mirrors 118 may suitably be molded as a single unit and the exemplary set of pattern mirrors 118 illustrated here includes first through fifth mirrors 202–210. The set of pattern mirrors 118 includes the diffractive element 120, which may suitably be a diffraction grating. The diffractive element 120 is shown here as positioned on an intersection between the mirrors 206 and 208. Placing the diffractive element 120 at an intersection between mirrors helps to prevent interference with the generation of a scan pattern. The diffractive element 120 is preferably small. An exemplary set of dimensions suitable for the diffractive element 120 is 2 mm by 1.2 mm. The small size of the diffractive element 120 helps to prevent interference with the generation of a scan pattern. Designing the diffractive element 120 so that it is small, and placing it away from the main reflective portion of the mirrors 202–210 allows the diffractive element to produce a single precisely directed line while minimizing or eliminating the generation of additional scattered light which will interfere with the generation of a desired scan pattern. The spinner 114 is shown here as being in the reference position. The laser source 112 is activated, producing the laser beam 122, which is striking the spinner 114 and being reflected to produce the reflected beam 134. The reflected beam 134 is shown here as tracing a path 212 across the mirror 206, from the initial position 138 to the terminal position 140. At the terminal position 140, the reflected beam 134 is shown as striking the diffractive element 120 to produce the diffracted beam 136. The diffracted 136 beam is in turn striking the reference position detector 122. The reference position detector is thus able to produce a photosignal which can be read by the controller (not shown in FIG. 2) to establish that the spinner 114 is in the reference position. Also shown here is the baffling aperture 142, which allows the diffracted beam 136 to strike the reference position detector, but prevents other light, such as scattered light from a reflected scan pattern, from striking the reference position detector 122.

Figure 3:
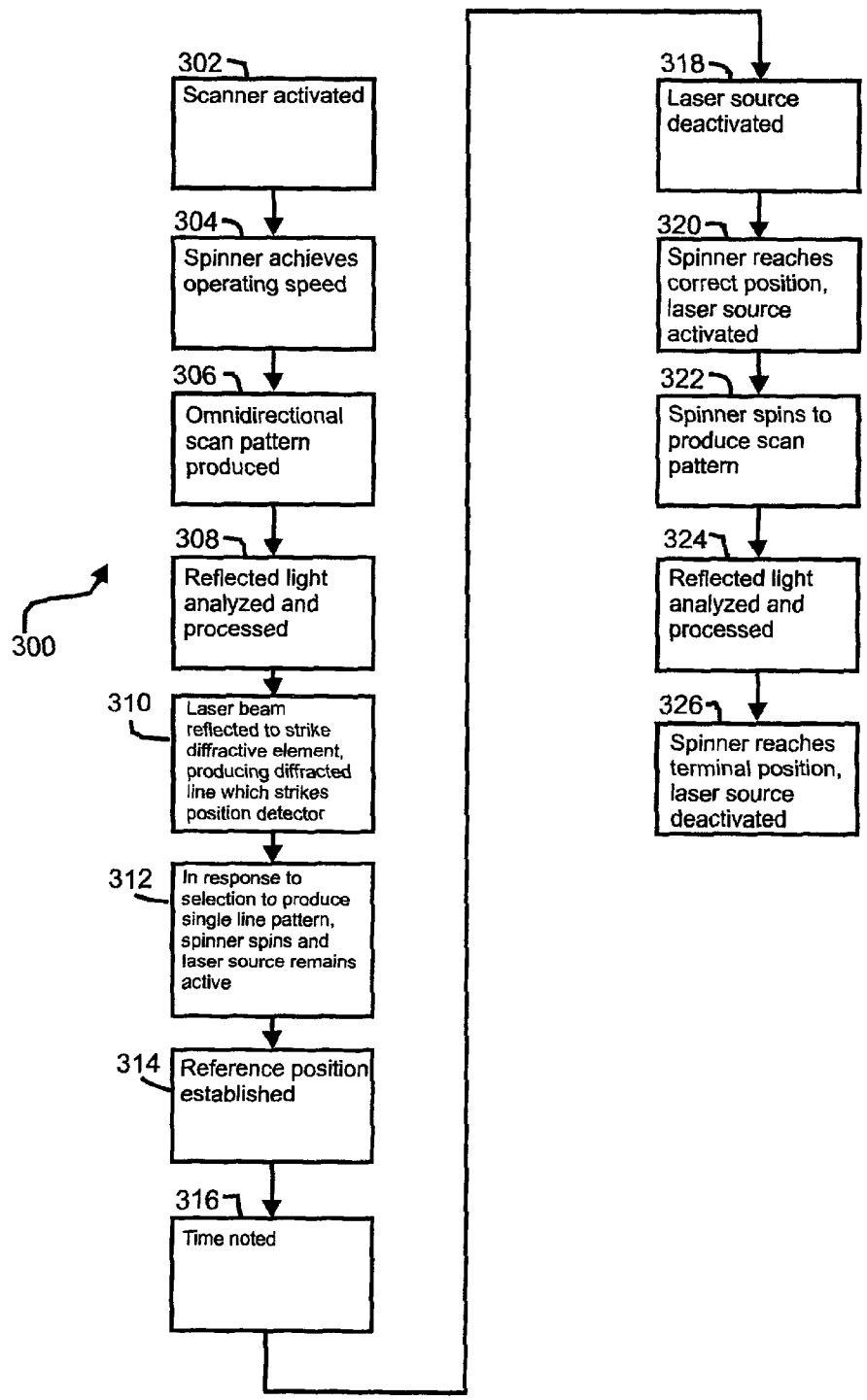
FIG. 3 illustrates a process of determining a spinner reference position and using the reference position to control the scanner according to the present invention.

FIG. 3 illustrates a process 300 for producing a scan pattern, using a diffractive element for determining a reference position of a spinner and for producing a scan pattern according to the present invention. At step 302, a scanner is activated. The scanner may suitably be similar to the scanner 100 of FIG. 1 and may suitably include a set of pattern mirrors similar to the pattern mirrors 118 of FIGS. 1 and 2 having a diffractive element similar to the diffractive element 120 of FIGS. 1 and 2. At step 304, a spinner within the scanner is presumed to have achieved operating speed based on elapsed time since activation of the scanner. At step 306, in response to a user selection to set the scanner to produce an omnidirectional scan pattern, a laser source is activated so that a laser beam strikes the spinner. At step 308, when light enters the scanner and strikes a scan detector within the scanner, the reflected light is analyzed to determine whether it reflects a bar code scan and to identify the bar code. At step 310, when the spinner reaches a reference position, the spinner reflects the laser beam so that the reflected laser beam strikes the diffractive element. The diffractive element diffracts the reflected laser beam to produce a diffracted line which strikes a reference position detector. The reference position detector produces a position photosignal, but because the scanner is set to produce an omnidirectional scan pattern, the photosignal may suitably be ignored. If desired, however, the reference position photosignal may be read during successive occurrences in order to establish the rotation speed of the spinner. At step 312, upon operation of selection switch by a user in order to set the scanner to produce a single line scan pattern, the spinner continues to spin and the laser source remains active. At step 314, when the spinner achieves a reference position, the diffracted line strikes the position photodetector and a position photosignal is produced. The position photosignal indicates that the spinner is in a reference position. At step 316, the time at which the position photosignal occurred is noted. At step 318, the laser source is deactivated in response to the photosignal. At step 320, when sufficient time is computed to have elapsed, based on the speed of the spinner and the time at which the reference position photosignal was detected, for the spinner to reach the correct position so as to reflect a laser beam to an initial position of a single line scan pattern, the laser source is activated. At step 322, the spinner spins, reflecting the laser beam so as to trace from the initial position to the terminal position in order to produce the desired single line scan pattern. At step 324, when light enters the scanner and strikes a scan detector within the scanner, the reflected light is analyzed and processed to determine whether it reflects a bar code scan and to process the reflected light to extract bar code information. At step 326, when the spinner reaches the position so as to reflect the laser beam to a terminal position of the scan pattern, the laser source is deactivated. Steps 320-326 are repeated so long as the scanner remains set to produce a single line scan pattern.

For purposes of illustration, the steps 300–326 are presented here as occurring sequentially, but it will be recognized that the steps 302–310 for producing and detecting an omnidirectional scan pattern and the steps 312–326 for producing and detecting a single line scan pattern need not occur in the sequence presented here, but that a single line scan pattern or an omnidirectional scan pattern may be produced whenever desired in response to a user's selection of mode.

While the present invention is disclosed in the context of a presently preferred embodiment, it will be recognized that a wide variety of implementations may be employed by persons of ordinary skill in the art consistent with the above discussion and the claims which follow below.

I claim:

1. A scanner comprising:

a laser source;

a spinner for reflecting light from the laser source, the spinner being rotated by a motor;

a set of pattern mirrors for receiving light reflected from the spinner and reflecting the light to produce a scan pattern;

a diffractive element for receiving light reflected from the spinner when the spinner is in a reference position and refracting the light to produce a diffracted beam;

a reference position photodetector for receiving the refracted beam and producing a reference position signal indicating that the spinner is in the reference position; and a controller operative to receive the reference position signal and to determine that the scanner is in the reference position upon receiving the reference position signal, to deactivate the laser source upon receiving the reference position signal, and to note the time at which the reference position signal occurs and to compute a position of the spinner based on the speed of the spinner and the time elapsed since the reference position photosignal was received by the controller.

2. The scanner of claim 1 wherein the diffractive element is a diffraction grating.

3. The scanner of claim 2 and also including a switch for selecting between an omnidirectional scan pattern and a single line scan pattern.

4. The scanner of claim 3 further comprising a baffling aperture in the vicinity of the reference position photodetector, the baffling aperture shielding the reference position photodetector from light other than the diffracted line in order to prevent an incorrect identification of a reference position of the spinner.

5. The scanner of claim 4 wherein the diffractive element is positioned at an edge of one of the set of pattern mirrors and is very small relative to the set of pattern mirrors.

6. The scanner of claim 5 wherein the diffractive element is positioned at an intersection between two pattern mirrors of the set of pattern mirrors.

7. A method of scan pattern generation, comprising:

activating a laser source within a scanner to generate a laser beam, the laser source being oriented to produce a laser beam directed toward a rotating spinner within the bar code scanner;

reflecting the laser beam from the spinner to produce a reflected beam;

when the spinner is in the reference position, directing the reflected beam to a diffractive element to produce a diffracted line and directing the diffracted line to a reference position photodetector to produce a reference position photosignal indicating that the spinner is in the reference position;

deactivating the laser source when the reference position photosignal is produced computing the position of the spinner during rotation of the spinner based on the speed of the spinner and the time elapsed since the reference position signal was produced.

8. The method of claim 7 further comprising the step of activating and deactivating the laser source when the spinner is in appropriate positions, in order to generate a desired scan pattern.

9. The method of claim 8 wherein the diffractive element is a diffraction grating.

10. A method of determining a reference position of a rotating spinner within a bar code scanner, comprising:

activating a laser source within a scanner to generate a laser beam, the laser source being oriented to produce a laser beam directed toward the spinner;

reflecting the laser beam from the spinner to produce a reflected beam;

when the spinner is in the reference position, directing the reflected beam to a diffractive element to produce a diffracted line and directing the diffracted line to a reference position photodetector to produce a reference position photosignal indicating that the spinner is in the reference position noting the time at which the reference position photosignal occurs.

* * * * *